Nov. 5, 1929.  A. E. W. JOHNSON  1,734,435
HARVESTER THRASHER
Filed April 11, 1927   3 Sheets-Sheet 2
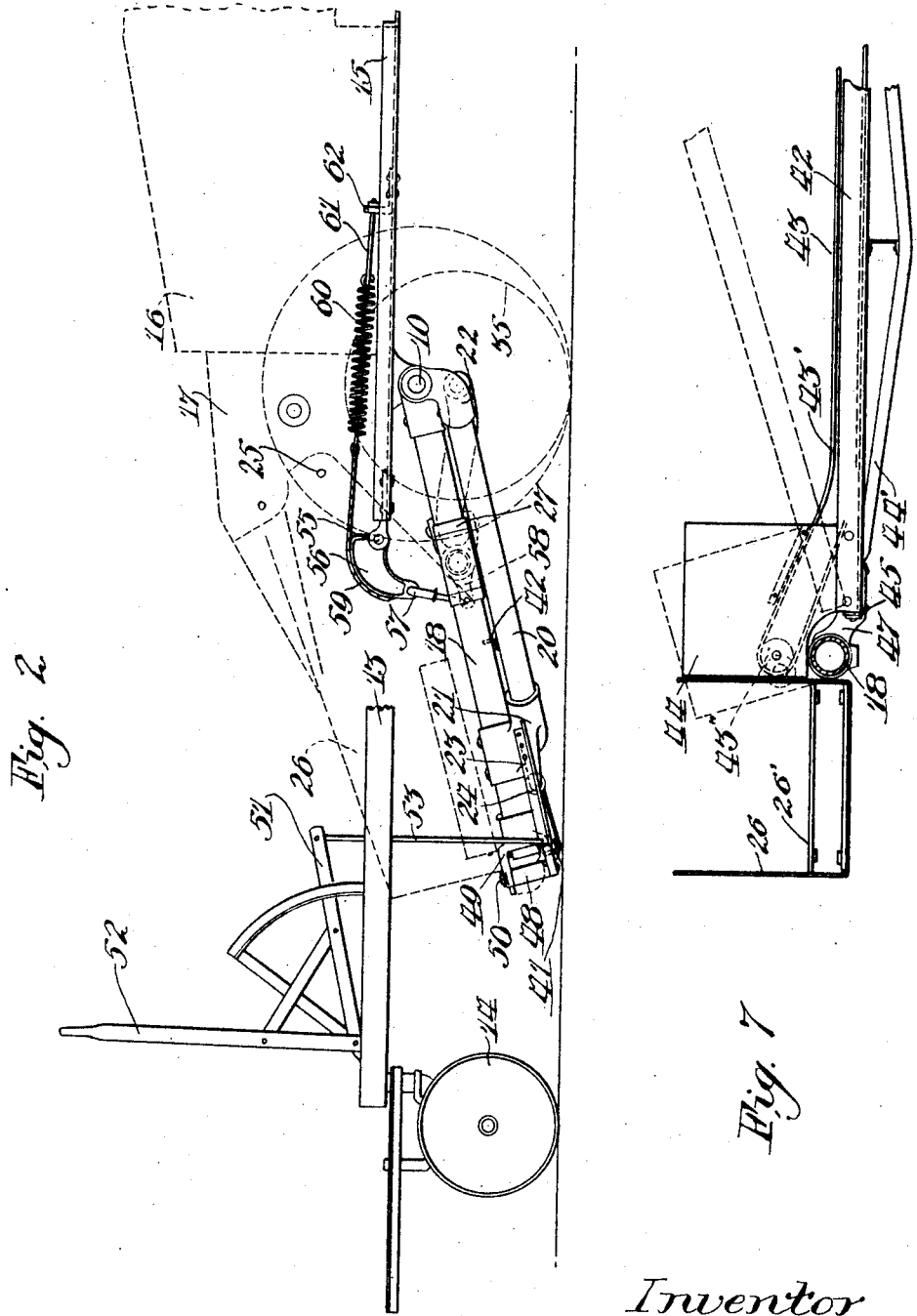
Inventor
Arnold E. W. Johnson
By H. F. Dascate
Atty.

Nov. 5, 1929.  A. E. W. JOHNSON  1,734,435
HARVESTER THRASHER
Filed April 11, 1927   3 Sheets-Sheet 3
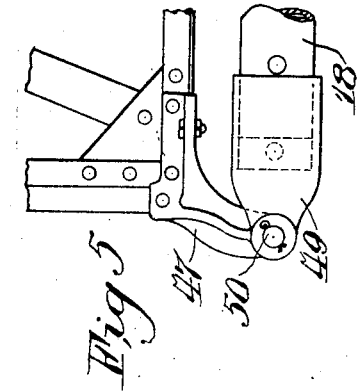
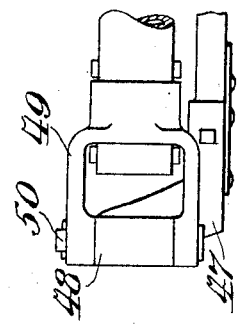
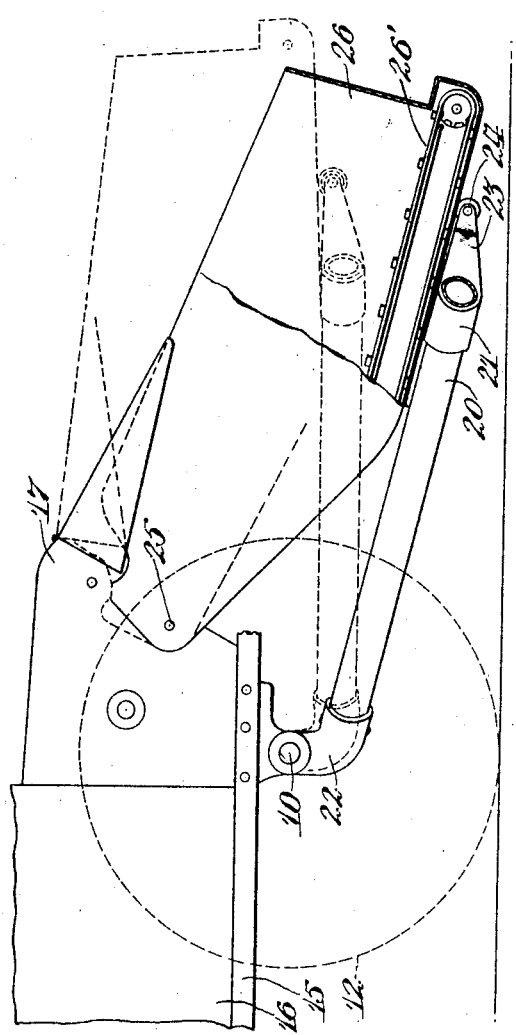
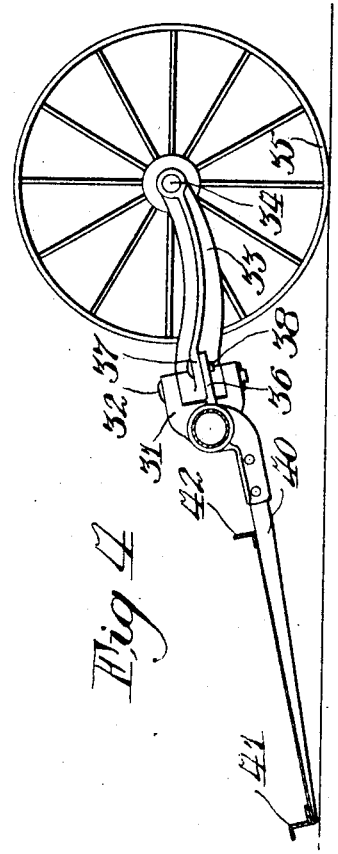
Inventor
Arnold E. W. Johnson
By H. P. Dalrymple
Atty.

Patented Nov. 5, 1929

1,734,435

UNITED STATES PATENT OFFICE

ARNOLD E. W. JOHNSON, OF CHICAGO, ILLINOIS, ASSIGNOR TO INTERNATIONAL HARVESTER COMPANY, A CORPORATION OF NEW JERSEY

HARVESTER THRASHER

Application filed April 11, 1927. Serial No. 182,570.

This invention relates to harvester thrashers, and particularly to an improved frame construction therefor.

These machines as now known in the art comprise a frame carrying a thrasher part including a feeder therefor and a harvester part which is in communication with said feeder. It is desirable that the frame rigidly carry the thrasher part, but floatingly carry the harvester part to enable the same to conform to ground irregularities. It is also desirable that such harvester part have a tilting action to adjust the same for varying heights of grain encountered, and, lastly, it is desirable that such harvester part be mounted in a manner to permit folding of the same to narrow the overall width of the harvester thrasher to permit its ready transport over narrow highways, and through narrow places. All of these features are at present known in the art, but they have not been constructed in a manner to be as effective as they might be.

Accordingly, it is an object of this invention to improve the construction of a harvester thrasher to the end that these harvester part functions of floating, tilting and folding will be more effective and easier of accomplishment; another object is to provide an improved frame organization for such machines; still another object is to provide an improved tilting control for the harvester part and, generally to improve such machines to enhance their utility.

Another very important object is to provide such a harvester thrasher in which the organization of parts is such that at all times and in all positions, the relative relationship between the harvester part and feeder will be maintained substantially constant and uniform.

Briefly, these desirable objects in the illustrative embodiment herein shown, are achieved in a harvester thrasher having relatively closely arranged main and intermediate wheels carried on a short stationary axle, said axle supporting the main frame which carries the thrasher part rigidly. This short main axle, underneath the main frame, pivotally carries a forwardly extending supplementary frame which is arranged entirely between said main and intermediate wheels. This supplementary frame slidably carries in an improved manner the feeder housing for the thrasher part on the main frame. A laterally and grainwardly extending harvester support is pivotally carried by this supplementary frame in such a manner that the support is located forwardly of the intermediate wheel, its outer or grainward end being supported in a grain wheel having its axis in line with the axis of the main axle. This harvester support is provided with forwardly extending, relatively short arms, which carry the header platform, its stubbleward forward corner being pivotally and detachably connected to the fore part of the supplementary frame. A vertical pivot is arranged in the lateral harvester support so that upon disconnection of this forward corner of the header platform from the supplementary frame, it is possible to fold the entire harvester part rearwardly, independently of the thrasher part, to narrow the overall width of the machine. When thus folded, the grain wheel yoke, which during normal operation is fixed, can be made to caster freely in trailing position. An improved adjusting control for the platform tilt action is provided in association with a novel counter-balance mechanism. The feeder for the thrasher is carried slidably on the supplementary frame, and as this frame also carries the harvester part, it is immediately seen that a common support is provided for the feeder and harvester, and as a result, the working relationship between these parts is maintained substantially uniform throughout the entire range of float and tilt of the harvester part.

This construction results in compactness, simplicity, and greater efficiency, all as will later more fully appear.

An illustrative embodiment of the invention has been shown in the accompanying sheets of drawings, wherein:

Figure 2 is a general side view, somewhat diagrammatic, looking from the stubbleward side of the machine;

Figure 3 is a side view showing the feeder housing mounting as seen along the line 3—3 of Figure 1, when viewed in the direction of the arrows;

Figure 4 is a side view of the grain wheel structure and header platform mounting;

Figure 5 is a plan detail view;

Figure 6 is a side view of the same detail; and

Figure 7 is a rear elevational view taken along the section line 7—7 of Figure 1, looking in the direction of the arrows.

Figure 1:
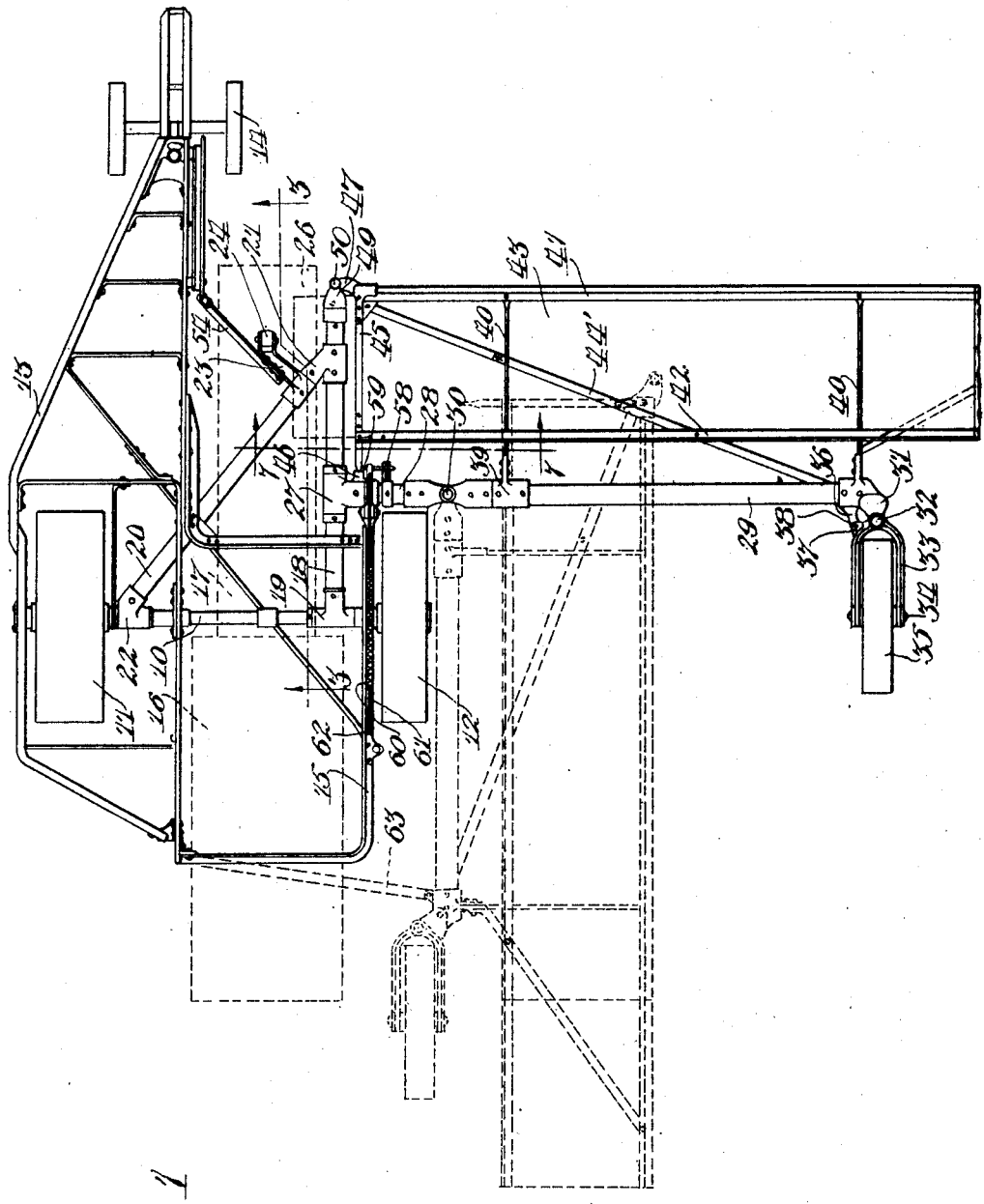
Figure 1 is an overall plan view of the improved harvester thrasher illustrating particularly the novel frame construction.

As shown in the drawings, particularly Figure 1 thereof, the improved harvester thrasher embodies a relatively short stationary, transversely disposed, main axle 10, which is carried in a main wheel 11 and an intermediate wheel 12. The stubbleward end of the main axle rigidly carries an A-frame 13 which extends forwardly and is supported on a steering wheel truck 14, while the grainward part of said main axle carries rigidly a frame part 15, secured to the A-frame and supporting a thrasher or separator 16, shown diagrammatically, and a cylinder housing 17 forwardly of the thrasher part. The parts so far described constitute the main frame and thrasher part of the harvester thrasher.

The main axle 10 pivotally carries a forwadly extending, supplemental frame which embodies a longitudinal member 18 arranged just inside of the intermediate wheel 12 and carried in a union 19 loose on said main axle. This member 18 extends forwardly a substantial distance, as shown, and is braced by a diagonally extending frame member 20 which is fixedly connected to the member 18 by means of a union 21, and at its rear end just inside of the main wheel 11 it is pivotally connected to the main axle by the loose union 22. The parts just described comprise the forwardly extending, pivotally mounted supplementary frame, arranged between the wheels 11 and 12 and underneath the main frame heretofore described.

The diagonal frame piece 20 carries near its forward end, a diagonally, stubblewardly and forwardly extending bracket 23 which carries a roller 24, as shown. Hung from the cylinder housing 17 on opposite pivots 25 and extending longitudinally forwardly is a feeder housing 26 communicating, as is usual, with said cylinder housing, the feeder housing at its front end resting on the roller 24, as shown. Thus, the fore part of the supplementary frame carries the feeder housing 26 for the thrasher part, which feeder housing encloses a feeder conveyer 26', as seen in Figure 7.

The harvester part will next be described. As shown best in Figure 1, the supplementary, longitudinal frame member 18 loosely or turnably carries a union 27 which is located a little forward of the front part of the wheel 12. This union 27 fixedly carries a laterally and grainwardly extending harvester support embodying a stub part 28 and a main part 29 pivotally connected thereto by a vertical pivot pin or hinge 30. It is important to note that this harvester support is arranged in advance of the intermediate wheel 12 and that the pivot 30 therein is disposed slightly grainwardly of said wheel 12. The grainward end of this support carries a bifurcated, rearwardly extending bracket 31 (see Figure 4), provided with a vertical pin 32 for pivotally mounting a rearwardly extending yoke 33 carrying a horizontally disposed pin 34 for mounting a relatively small grain wheel 35. It will be seen that the pin 34 is in alinement with the axis of the main axle 10 as indicated by the dot and dash line in Figure 1. The bracket 31 has an extension 36 provided with an opening, and the yoke 33 is similarly provided with an apertured extension 37, the two apertures being adapted to receive a king pin 38 when registered to hold the wheel 35 against castering, or permit castering thereof when the king pin has been removed.

Slightly grainwardly of the pivot pin 30, the harvester support 29 carries fast thereon a bracket 39. This bracket and the bracket 31 have secured thereto forwardly extending, longitudinally disposed arms 40, which carry at their front ends a transverse Z-bar 41 and, adjacent their rear ends, a transverse angle bar 42. This structure forms the usual harvesting or heading platform 43, which carries a conveyer apron 43' trained at its stubbleward end around a roller 43" which has its axis disposed above and in parallelism with the axis of the frame member 18. This roller 43" is carried as shown in Figure 7 in a frame plate 44 rising vertically from the angle bar 42 to which it is secured. The platform may be suitably cross braced by the diagonal brace 44', shown. The stubbleward end of the platform is provided with a longitudinally extending end, platform frame angle piece 45, the rear end of which is rounded and loosely engaged in a socket 46 formed in the front side of the union 27, as shown best in Figure 1.

The forward, stubbleward corner of the header platform carries a bracket 47 extending stubblewardly and provided with a vertical bored-out collar 48, which fits between the arms of a yoke 49, said arms being provided with aligned apertures, so that a removable pin 50 may be passed through the arms of the yoke and collar detachably to connect this forward corner of the platform to the forward end of the longitudinal supplementary frame member 18, which pivotally carries said yoke 49, as shown. The purpose of this construction will later be made clear.

Means, of course, must be provided for adjusting the heading platform up and down, as is usual in these machines, to vary the height of cut. Such mechanism will next be described. The A-part 13 of the main frame (see Figures 1 and 2) carries an arm 51, which may be swung by a hand lever 52 to pull up or push down on a link 53 connected to the rear end of the arm 51 and to an arm 54 rigidly secured to the bracket 23. Thus it can be seen that operation of the hand lever 52 will raise or lower the entire supplementary frame about its pivotal connections to the main axle 10. Of course, the platform being connected to the said supplementary frame must move up or down with it, such movement of the platform, however, being also caused by an improved counter-balancing spring mechanism now to be described.

Looking at Figures 1 and 2, it will be seen that the forward, grainward side of the main frame 15 carries on a pivot pin 55, a cam shaped member 56, said member having at its lower end a link connection 57 with an arm 58 made fast on the stub part 28 of the harvester support. Made fast in the lower, forward end of the cam 56 is a cable 59 which is trained rearwardly over the face thereof and is connected to a single counter-balance spring 60, or a battery of such springs, the spring extending rearwardly to be connected to a link 61, which is made secure to the rear part of the frame 15 by means of an anchor 62.

This concludes the detailed description of the various parts and their arrangement, and, accordingly, a summary description of the use and operation of the improved harvester thrasher will next be made.

The harvester thrasher when ready for operation in the field appears as shown in the full lines in Figure 1. The heading platform 43 is disposed transversely of the line of draft, with its forward stubbleward corner secured by the removable pin 50 to the rockable bracket 49 carried on the forward end of the supplementary frame member 18. The entire platform is rigidly supported by the arms 40 from the harvester support 29, which is floatingly connected through the stub part 28 to the supplementary frame member 18 by the rockable union 27. As the grain wheel 55 floats up and down, due to ground irregularities, the harvester support 29 and, of course, the platform therewith, may float up or down similarly in conformance with such ground irregularities. This floating action thus takes place about the longitudinal axis of the supplementary frame member 18 disposed stubblewardly of the intermediate wheel 12. Location of the harvester support 29 in a transverse line forwardly of the main wheels 11 and 12 is advantageous, in that it locates said support materially closer to the platform, permitting use of shorter arms 40, which arrangement overcomes vibrating or whipping of the platform, particularly at its outer free end. This arrangement, of course, also permits use of a smaller grain wheel 35, which can be brought closer to the platform, thereby more effectively supporting the grainward end of the platform. Such construction also aids materially in overcoming the whipping tendency of the platform at its free end, as will be obvious.

While cutting, it may become necessary to adjust the heading platform up or down to vary the length of cut in accordance with varying heights of grain encountered during travel of the machine. It will be remembered that the supplementary frame comprising the members 18, 20 is pivotally connected to the main axle 10 and arranged beneath the main frame 13, 15 of the machine. Such adjustment is accomplished upon manual operation of the lever 52 to pull up or push down on the link 53, which pulls up or pushes down on the bracket 23, through the arm 54 to raise or lower the entire supplementary frame 18, 20. During this adjustment, the spring balance mechanism 60 is effective to assist upward movement and counter-balance downward movement of the platform, such counter-balance being arranged stubblewardly of the pivot pin 30 in the harvester support. Such swinging movement of the platform is about the axes of the main axle 10 and grain wheel pin 34, said axes being in transverse alinement. In this connection, it is to be kept in mind that the feeder housing 26 for the thrasher part 16 is pivotally hung on pivots 25 located in a transverse line above the main axle 10; also, that the front end of said feeder housing is carried loosely on the roller 24 near the forward end of the supplementary frame 18, 20. Consequently, when the platform is adjusted upwardly, the feeder housing slides across the roller in a relative forward direction as it is carried upwardly with the platform, and vice versa, as the platform is adjusted downwardly, the feeder housing drops with it and slides relatively in a rearward direction. In this manner, the supplementary frame provides a common support for the feeder housing and harvester platform, and as a result, the relative working positions of the communicating conveyers of the platform and feeder are maintained constant in all positions of adjustment of the platform. (See Figures 3 and 7). Accordingly, locating the platform conveyer roller 43″ directly above the frame member 18 assures proper delivery of the grain from the platform conveyer 43′ onto the feeder conveyer 26′ regardless of the float or tilt of the platform, as will be obvious. Of course, it is to be understood that any approved form of detent lever lock will be associated with the hand lever 52 to maintain the platform locked in any position of adjustment.

When the harvester thrasher is not used for cutting and it is desired to transport the same over narrow highways and through narrow places, such as gateways, it becomes necessary to narrow the width of the machine to make such transport thereof possible. Such narrowing of the machine is accomplished by folding the major portion of the harvester support 29, with the header platform 42, rearwardly about the vertical pivot 30 from the full line position to the dotted line position indicated in Figure 1. Of course, it is to be appreciated that before such folding of the support can be accomplished the pin 50 must be removed to disconnect the forward stubbleward corner of the platform from the supplementary frame member 18. Also the pin 38 must be removed to free the grainwheel 35 to permit the same to caster freely in its new trailing position. The stubbleward frame piece 45 of the platform automatically leaves the socket 46 as the folding action is intiated. A bar generally indicated by the character 63 will be utilized to retain the support 29 in folded position, said bar being connectible thereto and to the rear stubbleward side of the main frame 15, as shown in Figure 1. Thus is the overall normal width of the machine materially narrowed to permit its ready transport. It is to be noted that the counter-balance spring mechanism 60 is in no wise interfered with by this folding action and that it is effective to balance the platform even in its folded position because of the pull it exerts on the stub part 28, to which the support 29 is connected by the pin 30. The pin 30 is arranged in the harvester support as close as practicable to the intermediate wheel 12 so as to get the maximum folding advantage.

From the above detailed disclosure it must now be apparent that an improved harvester thrasher construction has been provided which effectively achieves all of the desirable objects heretofore recited.

Quite clearly, various changes and modifications in the illustrative form of this invention herein shown and described may be resorted to by those skilled in this art, and accordingly it is to be understood that it is the intention to cover all such changes and modifications which do not materially depart from the spirit and scope of this invention, as indicated in the subjoined claims.

What is claimed is:

1. A harvester thrasher having a transverse axle, a forwardly extending vertically adjustable frame, pivoted to said axle, and a transverse harvester support pivotally connected to said frame and arranged in a line in advance of the axis of the transverse axle.

2. In a harvester thrasher, the combination of a wheel supported transverse main axle, a main frame rigidly carried thereon, a longitudinal forwardly extending supplementary frame pivotally mounted in relation to the main frame, a harvester support pivotally connected to said supplementary frame and extending transversely therefrom in a line forwardly of the main axle, and a harvester part carried by said support.

3. In a harvester thrasher, the combination of a wheel supported transverse main axle, a main frame carried thereon, a longitudinal forwardly extending supplementary frame pivotally connected to said main axle, a harvester support pivotally connected to said supplmentary frame and extending transversely therefrom in a line forwardly of and offset from the main axle, and a harvester part carried by and extending forwardly of said support.

4. In a harvester thrasher, the combination of a wheel supported transverse main axle, a main frame carried thereon, a longitudinal forwardly extending supplementary frame pivotally mounted in relation to the main frame, a harvester support pivotally connected to said supplementary frame and extending transversely therefrom in a line forwardly of and offset from the main axle, forwardly extending arms carried on said support, a transverse harvester platform carried on said arms, and means pivotally connecting said platform to the supplementary frame.

5. In a harvester thrasher, the combination of a transverse main axle, a wheel supporting the same at each end, a longitudinal forwardly extending frame pivotally connected to said main axle, a transversely extending harvester support pivotally connected to said frame and disposed in advance of the grainward wheel, and a harvester platform carried by said support.

6. A harvester thrasher having a wheel carried transverse axle, a thrasher part thereon, a pivoted longitudinal frame, a harvester part pivotally connected to the frame and extending transversely therefrom, a wheel support for the grainward end of the harvester part, the axis of said wheel support being in transverse alinement with the axis of the transverse axle.

7. In a harvester thrasher, the combination of a transverse main axle, a wheel supporting the same at each end, a vertically adjustable longitudinal forwardly extending frame disposed between the wheels, a transversely extending harvester support pivotally connected to said frame and disposed in advance of the grainward of said wheels, a platform carried by said support forwardly thereof, and means pivotally connecting the forward end of the platform to said frame.

8. In a harvester thrasher, the combination of a transverse main axle, a carrying wheel therefor at each end thereof, a main frame carried on the axle, a forwardly extending supplementary frame pivotally connected to the axle, a transversely extending harvester support connected to said supplementary frame and disposed forwardly of the grainward carrying wheel, a wheel support for the grainward end of the harvester support, and a harvester part carried by the support, said connection of the harvester support to the supplementary frame permitting a floating action of the support and harvester part.

9. In a harvester thrasher, the combination of a transverse main axle, a carrying wheel therefor at each end thereof, a main frame carried on the axle, a forwardly extending supplementary frame pivotally mounted in relation to the main frame, a transversely extending harvester support pivotally connected to said supplementary frame and disposed in a line in advance of the carrying wheels, a wheel support for the grainward end of the support, arms extending forwardly from the support, a harvester platform carried by the arms, and means pivotally connecting the forward side of said platform to the supplementary frame.

10. In a harvester thrasher, the combination of a wheel supported transverse axle, a main frame rigidly carried thereon, a thrasher on the main frame, a longitudinally forwardly extending supplementary frame pivoted to the axle, a harvester including a support extending transversely of and pivotally connected to the supplementary frame, a feeder pivotally connected to the thrasher above the axle and extending forwardly, and means on the supplementary frame for slidably carrying the forward end of the feeder.

11. In a harvester thrasher, the combination of a wheel supported transverse axle, a main frame rigidly carried thereon, a thrasher on the main frame, a longitudinally forwardly extending supplementary frame pivotally mounted in relation to the main frame, a harvester including a support extending transversely of and pivotally connected to the supplementary frame, a feeder pivotally hung from the thrasher and extending longitudinally forwardly, and roller means carried on the supplementary frame for slidably supporting the forward end of the feeder.

12. In a harvester thrasher, the combination of a transverse main axle carried by a wheel at each end thereof, a main frame rigidly carried on said axle, a thrasher carried on the main frame, a forwardly extending supplementary frame arranged between the carrying wheels and pivotally connected below the main frame to the axle, a feeder pivotally hung from the thrasher and extending forwardly thereof, roller means at the front end of the supplementary frame for slidably supporting said feeder, and a harvester including a support connected to the supplementary frame and extending transversely therefrom.

13. A harvester thrasher having a wheel carried transverse axle, a thrasher part thereon, a pivotally mounted supplementary frame extending forwardly of the thrasher part, a feeder pivotally hung from the thrasher part and resting on the supplementary frame to pivot therewith, a transversely extending harvester part floatingly connected to the supplementary frame and tiltable therewith, and a conveyer for the harvester part leading to the feeder.

14. A harvester thrasher having a wheel carried transverse axle, a thrasher part thereon, a pivotally mounted forwardly extending longitudinal frame member, a feeder supported by said frame member, said feeder disposed stubblewardly of said frame member, a harvester part floatingly connected to said frame member, said harvester including an apron conveyer embodying a roller arranged above and in parallelism with the frame member.

15. In a harvester thrasher, the combination of a wheel carried transverse main axle, a pivoted longitudinal forwardly extending frame, a harvester support pivotally connected to said frame and extending laterally therefrom in a line in advance of the axle wheels, a harvester connected to said support, a wheel support for the grainward end of the harvester support, means for vertically adjusting the harvester and harvester support by pivoting said frame, and means for counter-balancing the weight of the harvester and its support.

16. In a harvester thrasher, the combination of a main axle carried in a wheel at each end thereof, a forwardly extending pivoted supplementary frame connected to said axle, a transversely disposed harvester support pivotally connected to the supplementary frame, said harvester support being forwardly offset from said main axle and having its grainward end carried by a wheel, a harvester carried by said harvester support, means for adjusting the supplementary frame, harvester support and harvester vertically together, and means for counter-balancing the weight of the harvester.

17. In a harvester thrasher, the combination of a main axle, wheels carrying the same, a main frame carried on the axle, a pivoted supplementary frame connected to the axle and extending longitudinally forward therefrom, a harvester including a support pivotally connected to the supplementary frame and extending transversely therefrom in forward offset relationship with the main axle, spring counter-balance means carried by the main frame and connected to the harvester support, a grain wheel carrying the grainward end of the harvester, and means for adjusting the supplementary frame and harvester vertically.

18. In a harvester thrasher, the combination of a main wheel carried axle, a main frame thereon, a supplementary pivoted frame extending forwardly therefrom, a harvester including a support arranged in forward offset relationship with the main axle and pivotally connected to the supplementary frame, a grain wheel carrying said support, means for adjusting the supplementary frame and harvester vertically, a cam pivotally carried on the main frame, means connecting the cam to the harvester support, and resilient means having an anchor on the main frame and trained over and connected to said cam.

19. In a harvester thrasher, a transverse axle, spaced wheels carrying the same, a thrasher on the axle, a forwardly extending pivoted supplementary frame, a transversely extending harvester support pivotally connected to the supplementary frame, means carrying the grainward end of the harvester support, and means for causing the support to be folded horizontally rearwardly to a position alongside the thrasher.

20. In a harvester thrasher, a transverse axle, spaced wheels carrying the same, a thrasher on the axle, a forwardly extending supplementary frame pivotally connected beneath the thrasher, a transversely extending harvester support floatingly connected to said supplementary frame and disposed in a line in advance of the wheels, means carrying the grainward end of the support, and means in said support for causing the major portion of the same to be folded horizontally rearwardly to a position alongside the thrasher.

21. In a harvester thrasher, a transverse axle, spaced wheels carrying the same, a thrasher on the axle, a forwardly extending supplementary frame pivotally connected beneath the thrasher, a transversely extending harvester support pivotally connected to the supplementary frame, a caster wheel carrying the grainward end of the harvester support, locking means for preventing castering of said wheel, and means for causing the support to be folded horizontally rearwardly to a position alongside the thrasher, said caster wheel locking means adapted to be made ineffective to cause castering of said wheel when the harvester support is in its folded position.

22. In a harvester thrasher, a transverse axle, spaced wheels carrying the same, a thrasher on the axle, a forwardly extending supplementary frame pivotally connected to the axle, a transversely extending harvester support floatingly connected to said supplementary frame and disposed in a line in advance of the wheels, a wheel carrying the grainward end of the harvester support, locking means for holding said grain wheel against castering, means for causing the major portion of said harvester support to be folded horizontally rearwardly alongside the thrasher, said grain wheel locking means adapted to be made ineffective to cause free castering of the grain wheel when the harvester support is in its folded position.

23. In a harvester thrasher, a transverse axle, spaced wheels carrying the same, a thrasher on the axle, a forwardly extending supplementary frame pivotally arranged beneath the thrasher, a transversely extending harvester support floatingly connected to said supplementary frame and arranged forwardly and in offset relationship with the axle, means carrying the grainward end of the harvester support, a transverse harvester platform carried by the harvester support in advance thereof, the forward end of the same being pivotally and detachably connected to a forward part of the supplementary frame, means for balancing the weight of the harvester platform, and means for causing the harvester support and harvester platform to be folded horizontally rearwardly alongside the thrasher.

24. In a harvester thrasher, a transverse axle, spaced wheels carrying the same, a thrasher on the axle, a pivoted forwardly extending supplementary frame, a transversely extending harvester support pivotally connected to said supplementary frame and disposed in a line in advance of the axle carrying wheels, means carrying the grainward end of the harvester support, a transverse harvester platform carried by the harvester support in advance thereof, means pivotally and detachably connecting the front end of the harvester platform to a forward part of the supplemenetary frame, means for balancing the weight of the harvester platform, and means for causing the major portion of the harvester support and the harvester platform to be folded horizontally rearwardly alongside the thrasher.

25. A harvester thrasher having a stationary transverse axle, a triangular frame pivoted thereto and extending forwardly thereof, means for raising and lowering said frame, and a transverse support pivoted to the triangular frame at a point in advance of the axis of the transverse axle, and a harvester platform carried by the support.

26. A harvester thrasher having a stationary transverse axle carried on a pair of spaced wheels, a triangular frame including a longitudinal part, means pivotally connecting the frame to the axle between the wheels, a transverse harvester support, means pivotally connecting the same to the longitudinal part of the triangular frame, and a harvester carried on said support.

In testimony whereof I affix my signature.

ARNOLD E. W. JOHNSON.